United States Patent Office 2,947,319
Patented Aug. 2, 1960

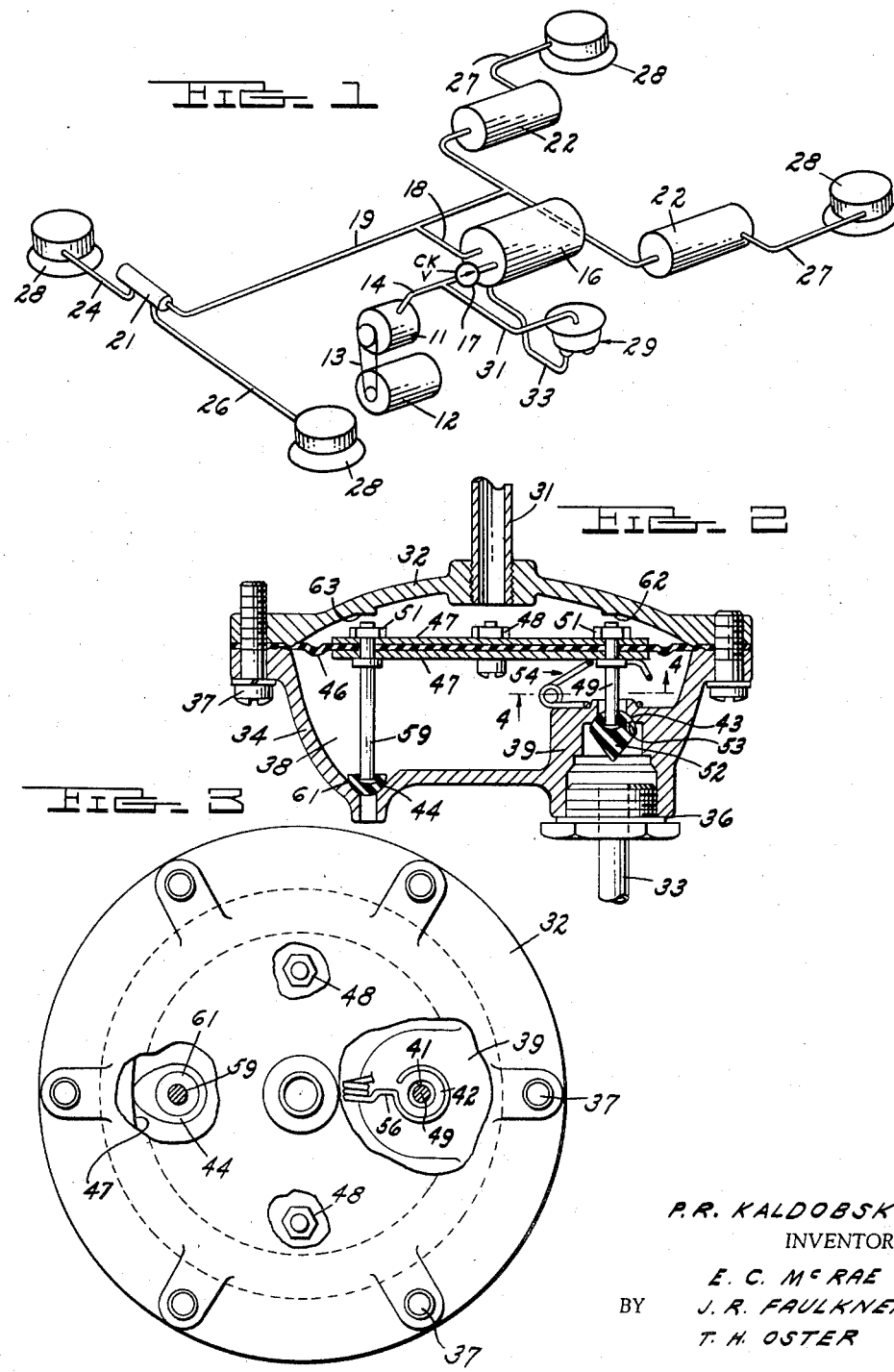

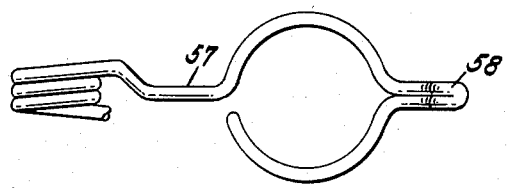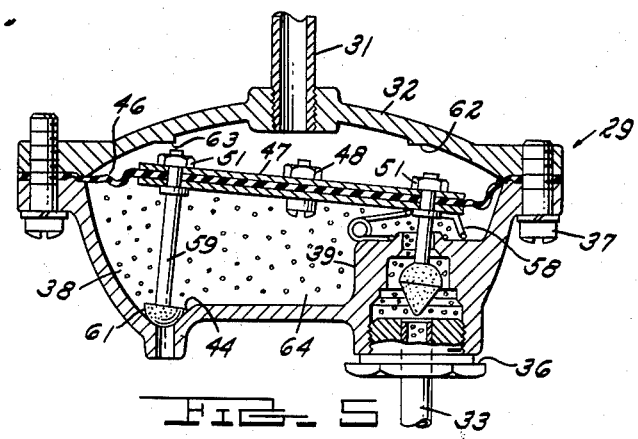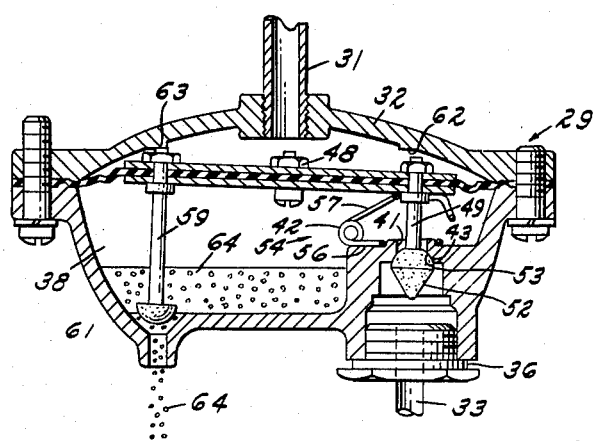

2,947,319
WATER EXPULSION VALVE

Phoebus R. Kaldobsky, Farmington Township, Oakland County, Mich., assignor to Ford Motor Company, Dearborn, Mich., a corporation of Delaware Filed Dec. 6, 1956, Ser. No. 626,734

8 Claims. (Cl. 137—204)

Condensation is an inherent problem in air suspension systems. It can effectively disrupt the proper functionings of the leveling valves and other important parts unless it is purged from the system.

In the instant application, the applicant has devised a method of expelling condensate with a minimum loss of pressurized air. This method incorporates the use of a novel water expulsion valve which is separated into two parts by a flexible diaphragm. The top side of the diaphragm is always open to the compressor discharge side while the bottom side is ported to the underside of the accumulator or reserve tank and the atmosphere respectively. A pair of unequal length intake and exhaust valve rods are secured to the diaphragm and operatively close or open these ports as the air pressure demands on the diaphragm dictate. When the compressor motor is started, pressurized air forces the diaphragm down closing the atmospheric port and opening the port connected to the air reserve tank. The air reserve tank port valve is spring urged to resist this movement until a predetermined air pressure has been reached. This spring also serves to limit the downward movement of the valve. Consequent build-up of air pressure in the tank forces any condensate through this open port and into the valve cavity. When the tank pressure has increased sufficiently to overcome the compressor discharge line pressure, which occurs only when the compressor motor has been turned off, the spring urged valve closes the air reserve tank port and urges the vent or exhaust valve rod away from the port permitting entrapped air and condensate to be expelled into the atmosphere. The object of this invention, therefore, is to provide a novel water expulsion valve which is simply operated on pressurized air from the compressor and reserve tank respectively.

Other objects and advantages will become more appart when considered in connection with the accompanying drawings in which:

Figure 1 is a schematic drawing of an air suspension system incorporating the applicant's novel water removal valve;

Figure 2 is a cross section view of a valve incorporating the applicant's invention;

Figure 3 is a plan elevational view partly in section of the valve shown in Figure 2;

Figure 4 is a section of the spring taken on the plane indicated as 4—4 of Figure 2;

Figures 5 and 6 show progressive stages of operation of the valve.

Referring now to the drawings in detail, an air suspension system is shown generally in Figure 1 and consists of an air compressor 11 which may be driven off the generator 12 as shown by a belt 13. A discharge line 14 permits the compressor to pump air into an accumulator or reserve tank 16 through a one-way check valve 17 which prevents air in the accumulator tank from backing up into the compressor when the compressor is turned off. Air from the accumulator tank 16 is then passed through air pipe 18 which junctures in T fashion to generally longitudinal extending conduit 19 which serves the front and rear leveling valves indicated generally at 21 and 22 respectively. Conduits 24, 26 and 27 connect the leveling valves 21 and 22 with the individual air bags 28, shown in part.

The novel water expulsion valve is indicated generally at 29 and is connected to conduit 14 upstream to the check valve 17 by a conduit 31. Conduit 31 is centrally threadably joined to the arcuately formed cover 32. A drain tube 33 is connected to the underside of the reserve tank 16 at one end and to the underside of the valve bowl 34 at the other end by means of a threaded gasket and adaptor 36. The bowl 34 is then secured to the cover 32 at their peripheral edge by a plurality of threaded bolts 37. Bowl 34 is internally defined by the provision of a cavity 38, which is generally circular in shape except for a walled-in apertured enclosure 39 separating the area adjacent the drain tube 33 and adaptor 36 from the cavity 38. Enclosure 39 has an inlet aperture 41 in axial alignment with and above the adaptor 36.

The aperture 41 is further characterized in that an annular raised flange 42 is located on the cavity 38 side and an arcuate countersink 43 is located on the adaptor 36 side of the aperture. On the opposite side of the bowl to the inlet aperture 41 and at the lowermost part of the cavity 38 is an arcuately shaped countersunk outlet drain 44 open to atmosphere.

Interposed between the cover 32 and the bowl 34 is a flexible diaphragm made from a conventionally obtainable material 46 having a circular disc 47 on each side thereof. As shown in Figure 3, the diaphragm 46 is secured to the discs 47 by a pair of nut and bolt assemblies 48 oppositely positioned on the diaphragm, or the latter can be molded integrally with the discs.

A flanged intake rod 49 is threadably secured by nut 51 in a nonmovable manner to the diaphragm and discs 46 and 47 so that it extends through the aperture 41 into the walled enclosure 39. A resilient plug 52 made from a natural or synthetic elastomer is bonded to the free end of the rod 49 so that the semispherical section 53 of the plug 52 is conformable to the countersunk surface 43. A vertically disposed coiled spring 54 is positioned atop the walled enclosure 39 so that its lower spring arm 56 extends toward and circumferentially surrounds the raised annular boss 42. The upper spring arm 57 is angled upwardly and bent at the point of contact with the disc 47 to halfway surround the flanged section of the rod 49. From this point the arm 57 is extended forwardly then bent downwardly to form a stop 58, reversed upon itself and bent around the other side of the rod 49.

As shown in Figure 5, stop 58 determines the extent to which the diaphragm 46 and rod 49 may be moved downwardly. It also can be seen that normally the spring 54 urges the diaphragm upwardly so that the plug 52 on inlet rod 49 closes the inlet aperture 41. The spring rate is fixed so that at a given air pressure it will be compressed until the stop 58 strikes the upper part of the enclosure 39. At that time the inlet hole 41 will be fully opened to the accumulator tank 16.

Directly opposite to the intake rod 49 is a similarly shaped radially flanged exhaust rod 59 which is likewise secured in a nonmovable manner to the diaphragm 46 and the circular discs 47 by nut 51. Exhaust rod 59 is longer than the inlet rod 49 and its free end has bonded thereto a resilient plug 61 of semispherical shape which is adapted to ride in the arcuate countersunk drain 44. It can also be seen from the drawings that the inlet and outlet rods 49 and 59 respectively are at 180° to each other, and the pair of nut and bolt assemblies 48 are also at 180° to each other and positioned directly between the inlet and exhaust rods. The valve 29 is completed by the provision of a pair of inwardly directed shoulders 62 and 63 on the inside part of the cover 32 directly above the rods 49 and 59 which effectively limits the upward movement of these rods. In the event that the plug 52 fails and is compressed into the aperture 41, the rod 49 will strike the shoulder 62 before the plug 52 can pass completely through the aperture 41.

As shown in Figure 1, the water expulsion valve of the applicant's design may be located in a convenient part of the vehicle remote from the tank 16. This permits the tank to have a simple conduit connection to the valve 29 and does not decrease or interfere with the clearance between the reserve tank and the road or any other part of the vehicle.

The valve 29 prior to the operation is shown in Figure 2. When the compressor 11 is started, pressurized air goes through the check valve 17 and into the reserve tank. This air reacts on the bottom side of the diaphragm. At the same time, pressurized air upstream to the check valve 17 is directed through conduit 31 to the top side of the diaphragm. Because of the check valve 17, air going through the conduit 31 is at a higher pressure, hence the diaphragm is uniformably moved downwardly until the exhaust rod plug 61 effectively seals the drain hole 44. The diaphragm then pivots about the plug 61 and is moved further downwardly taking with it the intake rod 49 until the spring extension 58 strikes the enclosure 39 and the inlet aperture 41 is fully uncovered. Condensate 64 which may have accumulated in the system is forced by tank pressure through the conduit 33 through the inlet aperture 41 and into the cavity 38. As long as the compressor 11 is operating, the inlet opening 41 will remain open to the reserve tank 16. When the compressor is turned off, the air pressure in the conduit 31 is lost through the compressor 11 whereas the air pressure in the reserve tank 16 and the cavity 38 remains constant because of the one-way check valve 17. The pressure in the reserve tank and in the cavity 38 consequently forces the diaphragm 46 to rise with the intake rod plug 53 closing the inlet aperture 41. A further decrease in pressure on the top side of the diaphragm causes the exhaust rod 59 to rise and pivot about the plug section 53 and thus uncover the outlet drain aperture 44 permitting the exhausting of entrapped condensate 64 from the cavity 38. It is also to be noted that only the entrapped pressurized air in the cavity 38 is lost, which is inconsequential.

The shape of the plugs 52—53 and 61 has been given careful consideration as have the shapes of the countersunk apertures 43 and 44 to permit the necessary pivoting without increased friction and loss of sealing.

Although the words condensate and water have been used throughout the specification, it should be understood that water vapor and compressor oil are also undesirable factors which will be expelled by the applicant's novel valve.

It will be understood that the invention is not to be limited to the exact construction shown and described, but that various changes and modifications may be made without departing from the spirit and scope of the invention, as defined in the appended claims.

What is claimed is:

1. A water expulsion valve unit for an air suspension system having a compressor, a reserve tank and a check valve between the compressor and the reserve tank to prevent the return of reserve tank air to the compressor, said valve unit comprising in combination a valve body, a diaphragm separating said body into an upper and lower section respectively, said upper section adapted to be connected to a source of compressed air, said lower section having a port open to atmosphere and an air-water entrance port, closure means for said ports including an exhaust valve and an intake valve spaced apart in substantial parallel relationship secured to the diaphragm whereby a generally vertical movement of the diaphragm will actuate said valves to open and close the ports in the lower section, said exhaust valve being located interiorly of said body and closed in the direction of flow of pressurized air-water, said intake valve being located exteriorly of the body and the air-water entrance port and biased to close in the direction of the flow of pressurized air-water whereupon the initial introduction of compressed air from the source of compressed air forces the diaphragm downward closing the port open to atmosphere and opening the air-water entrance port permitting pressurized air-water to enter the lower section and a subsequent drop in the pressure of the compressed air from the source of compressed air permits an upward movement of the diaphragm closing the air-water entrance port and opening the port open to atmosphere and expelling entrapped air-water.

2. A water expulsion valve for an air suspension system having an air compressor, a reserve tank, a discharge line from the reserve tank to the compressor and a one-way check valve in said line preventing the reserve tank air from returning to the compressor, said valve comprising, in combination, a valve bowl having a drain aperture open to atmosphere and an air-water entrance opening, said drain aperture and air-water entrance opening being disposed in the bottom portion of said bowl, an apertured valve cover secured to the bowl, a diaphragm interposed between the cover and the bowl, said apertured valve cover adapted to be connected to a source of compressed air, an exhaust rod secured at one end to the diaphragm and having a plug secured at its other end adapted to close the drain aperture from the inside of the bowl in the direction of the flow of pressurized air-water, an intake rod secured at one end to the diaphragm in parallel spaced apart relationship to said exhaust rod, said intake rod extending through the air-water opening exteriorly of the bowl and having a plug secured at its other end adapted to close the air-water entrance opening in the direction of the flow of pressurized air-water, spring means normally urging the intake rod plug to close said air-water entrance opening whereupon the initial admittance of compressed air from the source of compressed air forces the diaphragm connected rod plugs to initially close the drain aperture and open the air-water entrance opening permitting air-water to enter the bowl, and the subsequent discontinuance of compressed air from the source of compressed air results in the respective closing of the air-water entrance opening and the subsequent opening of the drain aperture expelling entrapped air-water.

3. The structure defined by claim 2 which is further characterized in that said spring means comprises a vertically disposed coil spring having a lower arm biased against the bowl and an upper arm angled upwardly and then bent to conform to the diaphragm then extending downwardly to form a stop for the downward movement of the diaphragm, said spring biasing said intake rod plug to close the air-water entrance opening.

4. A liquid expulsion valve for an air suspension system having a driven compressor, a storage receptacle, a compressor discharge line connecting the compressor to the receptacle and a one-way check valve located in said discharge line preventing the return of receptacle air to the compressor, said valve comprising in combination, a valve bowl having an air-water receiving cavity and a peripheral mounting flange, an arcuate countersunk drain aperture open to atmosphere in the bottom of the bowl, a walled-in apertured air-water entrance enclosure opposite to the drain aperture and having an enlarged opening at the atmosphere side and a smaller entrance aperture at the side adjacent the cavity, said walled-in aperture being countersunk on the side adjacent the enlarged opening, an arcuately formed centrally apertured cover, bolt means securing the bowl mounting flange to the cover, a flexible diaphragm interposed between the cover and the bowl mounting flange, said apertured cover being adapted to be connected to a source of compressed air, rod mounting means secured to the diaphragm, an exhaust and intake rod secured in a nonmovable manner to the rod mounting means in general axial alignment with the drain aperture and the smaller entrance aperture respectively, said exhaust rod being adapted to close the drain aperture from the inside of the valve bowl in the direction of the flow of pressurized air-water, said intake rod extending through said smaller entrance aperture, and being adapted to close the entrance aperture from the outside of the bowl in the direction of the flow of pressurized air-water, resilient plugs on the end of said rods adapted to be engaged with their respective countersunk apertures, a coiled spring having an arm adjacent and circumferentially surrounding the smaller entrance aperture and another arm in engagement with the rod mounting means on the diaphragm circumferentially about the intake rod and biasing the intake rod to close the entrance aperture, said upper arm being angled toward said first mentioned arm to define a stop for the vertical movement of said intake valve.

5. The structure defined by claim 4 which is further characterized in that said cover is provided with an inwardly extending shoulder in general axial alignment with the intake and exhaust rods limiting the vertical upward travel of said rods.

6. A water expulsion valve for an air suspension system having an air compressor, a reserve tank, a discharge line from the reserve tank to the compressor and a one-way check valve in said line preventing reserve tank air from returning to the compressor; said valve comprising in combination a valve bowl having a drain aperture comprising an arcuately shaped countersunk aperture on the inside of the bowl open to atmosphere and a water entrance opening comprising an arcuately shaped countersunk opening on the outside of the bowl, an apertured valve cover secured to the bowl, a flexible diaphragm sandwiched between a pair of circular disks secured to said diaphragm, said diaphragm being interposed between the cover and the bowl, said apertured valve cover adapted to be connected to a source of compressed air, rod means including an exhaust rod having a plug engageable with said arcuate countersunk drain aperture on the inside of the bowl and an intake rod extending through the entrance opening, said intake rod having a plug engageable with the arcuately countersunk entrance opening on the outside of the bowl, said rod means secured to the diaphragm and adapted to close or open the drain aperture and the water entrance opening respectively and spring means normally urging the entrance opening rod to close said opening whereupon the initial admittance of compressed air forces the diaphragm connected rods to initially close the drain aperture and open the water entrance opening permitting water to enter the bowl, and the subsequent discontinuance of compressed air from said source of compressed air results in the respective closing of the water entrance opening and the subsequent opening of the drain aperture expelling entrapped air and water.

7. The structure defined by claim 6 which is further characterized in that the drain aperture and the entrance opening are 180° apart, and that the intake rod and the exhaust rod are 180° apart, and said plugs having elastomeric properties and bonded to said rods.

8. A water expulsion valve unit for an air suspension system having a compressor, a reserve tank and a check valve between the compressor and the reserve tank to prevent the return of reserve tank air to the compressor, said valve unit comprising in combination a valve body, a diaphragm separating said body into an upper and lower section, respectively, said upper section adapted to be connected to a source of compressed air, said lower section having a vertically disposed port open to atmosphere and a vertically disposed air-water entrance port, closure means for said ports including a vertically disposed exhaust valve and vertically disposed intake valve, means securing each of said valves to said diaphragm in parallel spaced apart relationship on one side of said diaphragm and in substantial axial alignment with said ports, said exhaust valve being disposed within the lower section of said valve body and cooperating with said port open to atmosphere to close said port in the direction of the flow of pressurized air-water, said intake valve being disposed exteriorly of the lower section of said valve body and cooperating to close said air-water entrance port from the outside of said body in the direction of the flow of pressurized air-water, spring means biasing said intake valve to close said air-water entrance port whereby a generally vertical movement of the diaphragm will actuate said valves to open and close the ports in the lower section whereupon the initial introduction of compressed air from the source of compressed air forces the diaphragm downward.

References Cited in the file of this patent

UNITED STATES PATENTS

| | | |
|---|---|---|
| 2,509,880 | Pelton | May 30, 1950 |
| 2,572,311 | Burd | Oct. 23, 1951 |
| 2,591,432 | Hoerner | Apr. 1, 1952 |
| 2,700,987 | Whalen | Feb. 1, 1955 |
| 2,739,605 | Smith | Mar. 27, 1956 |